US007224776B2

(12) United States Patent
Creamer et al.

(10) Patent No.: US 7,224,776 B2
(45) Date of Patent: May 29, 2007

(54) METHOD, SYSTEM, AND APPARATUS FOR TESTING A VOICE RESPONSE SYSTEM

(75) Inventors: Thomas E. Creamer, Boca Raton, FL (US); Peeyush Jaiswal, Boca Raton, FL (US); Victor S. Moore, Boynton Beach, FL (US); Terry G. Wigal, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 10/736,026

(22) Filed: Dec. 15, 2003

(65) Prior Publication Data

US 2005/0129194 A1    Jun. 16, 2005

(51) Int. Cl.
*H04M 11/00* (2006.01)
(52) U.S. Cl. ............... 379/88.18; 379/1.02; 379/26.01; 379/29.01; 379/88.01; 704/201; 704/246; 704/270.1
(58) Field of Classification Search ............. 379/88.18, 379/1.02, 26.01, 29.01, 88.01; 704/201, 704/246, 270.1
See application file for complete search history.

(56) References Cited

U.S. PATENT DOCUMENTS

| 5,940,472 | A | * | 8/1999 | Newman et al. | ......... 379/10.02 |
|---|---|---|---|---|---|
| 6,477,492 | B1 | | 11/2002 | Connor | |
| 6,516,051 | B2 | | 2/2003 | Sanders | |
| 6,598,022 | B2 | | 7/2003 | Yuschik | |
| 2002/0076008 | A1 | * | 6/2002 | Neary | ...................... 379/88.01 |
| 2002/0077819 | A1 | * | 6/2002 | Girardo | ...................... 704/260 |

OTHER PUBLICATIONS

Nix, C.J., "Testing Interactive Voice Response Systems", IBM Technical Disclosure Bulletin, vol. 39, No. 11, pp. 109-110, (Nov. 1996).

* cited by examiner

*Primary Examiner*—Duc M. Nguyen
*Assistant Examiner*—Aung T. Win
(74) *Attorney, Agent, or Firm*—Akerman Senterfitt

(57) ABSTRACT

A method of testing a voice response system can include establishing a communications link between a test system and the voice response system, sending a signal to the test system over the voice link indicating that a voice prompt is to follow, and sending the voice prompt to the test system over the voice link. A system having means for performing the various steps disclosed herein and a machine readable storage for causing a machine to perform the steps described herein are also provided. The present invention relieves a tester or test system from having to know or be programmed with the operational details of a VRS, to adequately test the functionality of the VRS, as the VRS itself can provide the necessary test data to the test system.

21 Claims, 2 Drawing Sheets

METHOD, SYSTEM, AND APPARATUS FOR TESTING A VOICE RESPONSE SYSTEM

BACKGROUND

1. Field of the Invention

The invention relates to the field of voice response systems and, more particularly, to testing voice response systems.

2. Description of the Related Art

A voice response system (VRS) can provide an automated way of communicating information between a user and a business. A VRS can use a prerecorded database of voice messages to present options to a user. Further, a VRS can accept a combination of voice telephone inputs and touch-tone keypad selections and can provide appropriate responses in the form of voice, fax, callback, e-mail and perhaps other media. A VRS can also provide pre-recorded voice responses for appropriate situations, keypad signal logic, and access to relevant data.

Voice response systems advantageously allow users to provide information to and retrieve information from a business without the interaction of an employee. Accordingly, such systems are becoming more common throughout businesses for simple interactions between businesses and users; however, such systems have not completely replaced human employees for all interactions. For instance, while it is still the norm for users to interact with a human customer representative for complex matters, simple functions such as checking account balances and order status can be provided by a VRS.

During development and operation of a VRS application and system, it is necessary to simulate a plurality of calls so that performance of the VRS under strain can be monitored as well as to test the execution of particular software or computer program modules in the VRS. Such a simulation can be performed using a testing system such as a bulk call generator which can make telephone calls to the VRS directly or through some sort of network and/or switching system. Several types of telephone calls may be designed and the testing system may simulate one or a combination of different calls at the same time using several channels connected to the VRS system.

A VRS, including the VRS operational software, can be tested to determine whether correct prompts are played in response to various user inquiries. Execution information pertaining to the execution of the operational software of the VRS can be stored in local memory necessitating access to local execution logs or other data stores within the VRS itself. Presently, testing of VRS's, particularly the verification of execution information such as execution path verification and verification of the execution of software modules, requires that the tester or testing system have extensive knowledge of how the VRS works. More particularly, the tester must know which software modules are to be executed, the prompt hierarchy of the VRS, as well as many other operational details in order to adequately test the functionality of the VRS.

SUMMARY OF THE INVENTION

The present invention provides a method, system, and apparatus for testing a voice response system (VRS). The present invention allows a tester to evaluate a VRS, whether located proximate to or remote from the system under test. Further, the present invention enables the VRS to provide testing information to the tester regarding the features to be tested. In accordance with the inventive arrangements disclosed herein, testing voice prompts can be provided from a VRS to a test system using the same interface through which users interact with the VRS. The testing voice prompts then can be played back to the VRS as speech commands to initiate programmatic actions for testing.

The present invention relieves the tester or testing system from having knowledge of the various operational details of the VRS, for example the execution of software modules or the ordering or hierarchy of voice prompts, that typically is required to test conventional VRS's. One aspect of the present invention can include a method of testing a VRS. The method can include establishing a voice link between a test system and the voice response system and sending a signal to the test system over the voice link indicating a voice prompt is to follow. For example, the signal can be one or more dual tone multi-frequency (DTMF) signals. The method also can include sending the voice prompt to the test system over the voice link.

In one embodiment, the method can include sending a further signal to the test system to distinguish separate additional voice prompts. A voice command can be received from the test system. Notably, the voice command can be based on the voice prompt sent by the VRS to the test system. That is, the VRS can provide audio data such as voice prompts and DTMF signals to the test system. That received audio then can be played back to the VRS from the test system in the context of a VRS test. Accordingly, the VRS provides the necessary audio or test data to the test system for testing itself. In another embodiment, the received voice command can be compared with the voice prompt.

In still another embodiment, the method can include responsively initiating a programmatic action based upon the voice command and logging the voice command, the voice prompt, and/or the programmatic action. Accordingly, the programmatic action can be compared with an expected programmatic action based on the voice prompt.

Other embodiments of the present invention can include a system having means for performing the various steps disclosed herein and a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
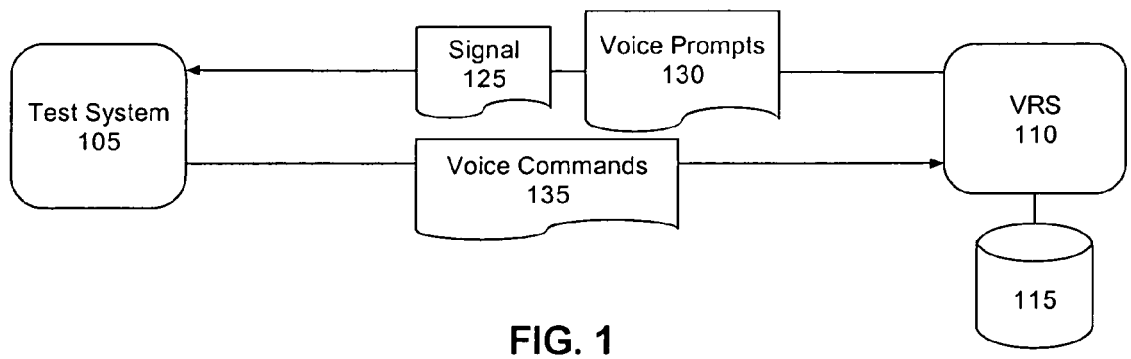
FIG. 1 is a schematic diagram illustrating a system for testing a voice response system in accordance with one embodiment of the present invention.

FIG. 1 is a schematic diagram illustrating a system 100 for testing a voice response system (VRS) in accordance with one embodiment of the present invention. As shown, the system 100 can include a test system 105 and a VRS 110 in communication over a communications link. The system 100 can also include a data store 115. The test system 105 can be a universally adaptive test system 105 that is not limited to being specifically configured to test particular functions of a specific VRS 110 or test functions of a specific VRS 110 in any particular order. The test system 105 need not be programmed with particularized instructions for testing the VRS 110. Still, the VRS 110 can provide the test system 105 with the necessary information and instructions to test the VRS 110. The VRS can indicate such testing information by sending one or more signals 125.

The test system 105 can be configured to process the information provided by the VRS 110 that is indicated by the signal 125. Such processing can include recording and logging the audio information sent by the VRS 110 that follows the signal 125, initiating programmatic testing functions, and sending information to the VRS 110 based on the audio information received from the VRS 110. For instance, the test system 105 can record audio sent by the VRS 110 and send the audio back to the VRS 110 as voice commands 135 to simulate a caller voicing a menu option. In such an arrangement, the test system 105 can test any VRS 110 that is capable of sending voice prompts 130 which can be indicated by the signal 125.

The test system 105 can be implemented as a standalone, hardware-based system or as a combination of both hardware and software. The test system 105 can also include appropriate hardware and/or software, such as a Telephony Application Program Interface (TAPI), for providing a telephony interface for receiving and sending audio including speech voice commands 135 and signals 125, which can be dual tone multi-frequency (DTMF) signals. The test system 105 can also include a processor for decoding or recognizing DTMF signals. For example, in one embodiment, the test system 105 can be implemented as a call generator having or being communicatively linked with sound generation and analysis equipment.

In another embodiment, the test system 105 can be implemented as an information processing system having a suitable telephony or network interface. In any case, the test system 105 can be configured to establish a communications link, such as a voice link and/or data link with the VRS 110. Such a voice link, for example a telephone call or a Voice Over Internet Protocol call, can be established through a Public Switched Telephone Network, a packet-switched network, an Integrated Services Digital Network, a private branch exchange, a local area network, a wide area network, the Internet, and/or a test bed environment. Accordingly, the test system 105 can be remotely located from, and in communication with, the VRS 110 over any suitable communications link allowing the VRS 110 to be tested from any location at which a communication link is available.

The VRS 110 can be implemented as one or more computer programs, software modules, and the like, referred to as operational software, executing within an information processing system. Like the test system 105, the VRS 110 can include appropriate hardware and/or software, such as a Telephony Application Program Interface (TAPI), for providing a telephony interface for receiving and sending audio including speech and/or DTMF signals. The VRS 110 can also include a processor for decoding or recognizing DTMF signals. The VRS 110 can answer received telephone calls and play audible prompts to callers over the communications link. The audible prompts can be generated using a text-to-speech system or can be generated by sending recorded portions of audio. Additionally, the VRS 110 can include a speech recognition system for converting received spoken responses to text and processing DTMF signals.

The VRS 110 can be configured to provide signals 125, such as DTMF signals, and voice prompts 130 over a voice link established between the testing system 105 and the VRS 110. More particularly, the signals 125 and the voice prompts 130 can be provided through a primary audio interface used to communicate with users of the VRS 110 during normal operation. Accordingly, the VRS 110 can be placed in a test mode where the signals 125 and the voice prompts 130 are provided over the same communications links that are used during normal operation.

The signals 125 can indicate to the test system 105 which information is relevant for testing the VRS 110. That is, the signals 125 can indicate that testing information is to follow. The signals 125 can include DTMF signals and other audible and/or data signals to identify the relevant testing information. In one example, the signals 125 can indicate that all information following is relevant for testing the VRS 110. In this arrangement, voice prompts 130 can be included to provide the test system 105 with the necessary testing information. The voice prompts 130 can include audible messages, such as recorded speech or generated speech, and/or a series of DTMF signals which can be played back to the VRS 110 as voice commands 135 to simulate a user voicing an option and/or keying an option.

It should be noted that the VRS 110 can send multiple signals 125 and multiple voice prompts 130 to the test system 105. Accordingly, a primary signal 125 can be the first indicator that test information is to follow. Following the primary signal 125, one or more voice prompts 130 can be sent to the test system 105. Additional signals 125, or secondary signals, can be sent to the test system 105 to distinguish the separate voice prompts 130. In other words, additional signals 125 can be sent or played between consecutively played voice prompts 130. As such, the additional signals 125 can be temporarily arranged with the voice prompts 130 to indicate the beginning and ending of each voice prompt 130 or can be used to signify a time length of individual voice prompts 130. Additionally, the additional signals 125 can be the same or different as the primary signal 125.

The data store 115 can include any suitable medium for storing data such as the signals 125 and the voice prompts 130. The data store 115 can also be configured to store the voice commands 135 received from the test system 105. Additionally, the data store 115 can store logs of the information sent by the VRS 110 and the information received from the test system 105. Further, the data store 115 can be configured to store a log of the VRS programmatic actions that occur in response to the information received from the test system 105. Accordingly, the data store 125 can include a hard drive, flash memory, random access memory ("RAM"), read only memory ("ROM"), and the like. Additionally, the data store can include multiple, separate data stores for mirroring stored data for retrieval and loss prevention.

In operation, a communications link can be established between the VRS 110 and the test system 105. The VRS 110 can send initial voice prompts or can begin the session by sending the signal 125 followed by voice prompts 130 to the test system 105. The signals 125 can indicate, to the test system 105, that the voice prompts 130 that contain the testing information will be forthcoming. In accordance with voice prompts 130, the test system 105 can make selections in the VRS 110. More particularly, the audio, whether speech or DTMF signals, received from the VRS 110 which follows the signals 125, can be recorded and played back to the VRS 110. In this manner, the VRS 110 can be configured to provide desired test selections directly to the test system 105 to be played back. For instance, the test system 105 can make selections by sending the voice prompts 130 received from the VRS 110 back as voice commands 135. DTMF signals also can be played back as well as any other audio.

In response to the selections, the VRS 110 can perform one or more programmatic actions which can be recorded and/or tested. As the VRS 110 sends the voice prompts 130 to the VRS 110 as voice commands 135 (the testing information), the VRS 110 should predictably react. Thus, it can be determined whether the VRS 110 responds accordingly by initiating particular programmatic actions, executing particular computer programs, software modules, or portions thereof, referred to as operational software.

Further, the VRS 110 can include test computer programs which gather programmatic action information and store the information within the communicatively linked data store 115. While the invention is not limited to the use of one particular type of computer program, in one embodiment the test computer program(s) can be implemented as Java methods. Once the VRS 110 initiates the programmatic actions, or portions thereof, the VRS 110 can store the execution information in the data store 115, send the execution information as voice prompts, and/or encode the execution information as DTMF signals which can be sent over the communications link to the testing system 105. Thus, the test system 105 can also log the results of the test.

It should be noted that in one arrangement, the test system 105 can include a text-to-speech system or can be communicatively linked to a text-to-speech system. In this arrangement, the test system 105 can send voice commands 135, including speech and/or DTMF signals, generated by sending or playing recorded voice prompts 130 or generated by using a text-to-speech system. Further, as the test system 105 can receive voice prompts 130 from the VRS 110, in one embodiment, the test system 105 can include, or be connected with, a speech recognition system for converting voice prompts 130 to text.

Figure 2:
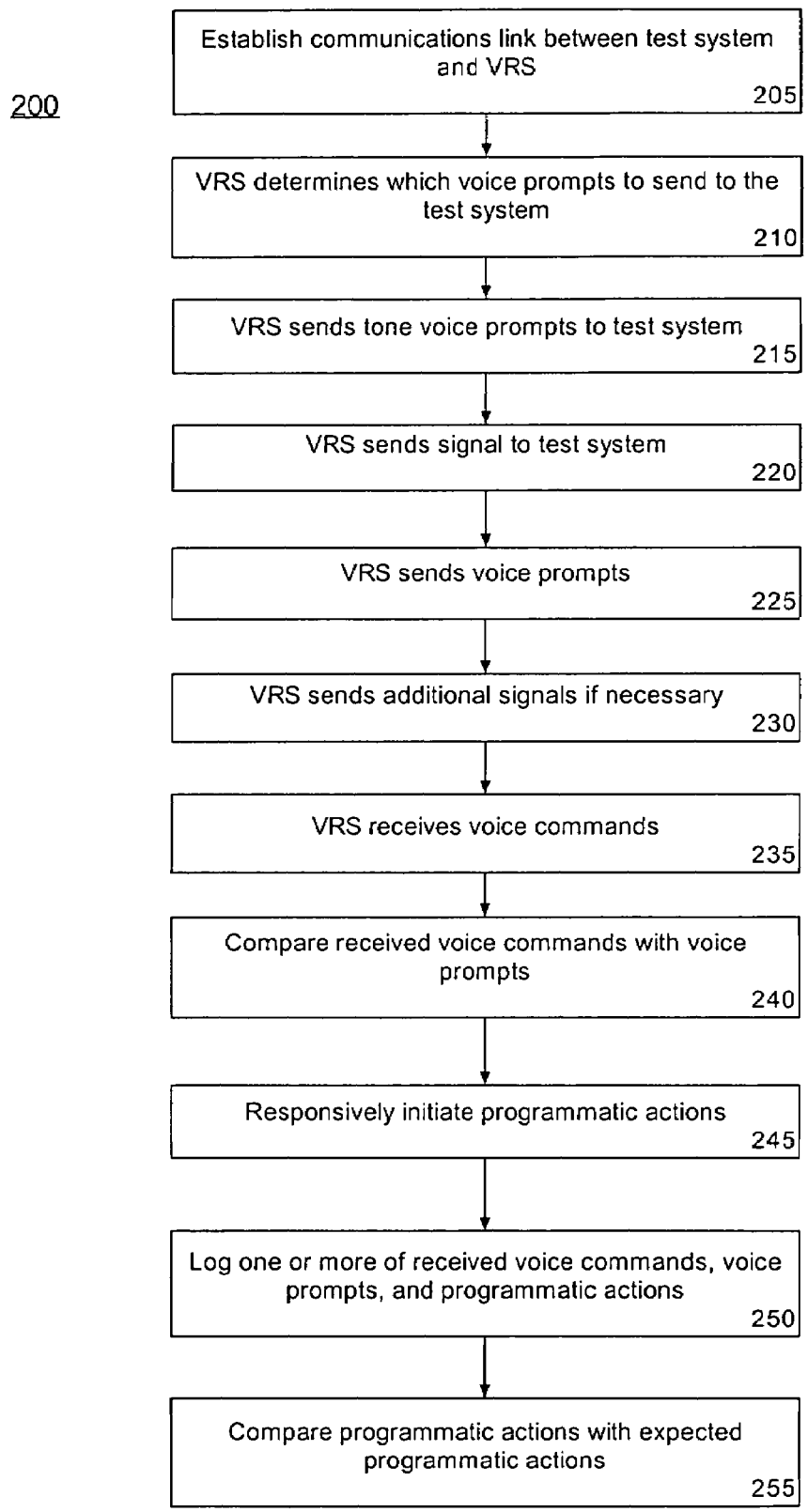
FIG. 2 is a flow chart illustrating a method testing a voice response system in accordance with another embodiment of the present invention.

FIG. 2 is a flow chart illustrating a method 200 of testing a voice response system in accordance with one aspect of the present invention. The method 200 can begin in step 205 where a communications link is established between a testing system and a VRS to be tested. The communications link can provide for data and voice transmission and, for example, can be a telephone call, whether an IP-based telephone call, a mobile call, a wireless call, a conventional telephone call, or some other voice link. In one embodiment, the testing system and the VRS can be remotely located from one another allowing the VRS to be tested without being located on premises with the testing system. In another embodiment, the testing system and the VRS can be located proximate to one another and communicate over a telephone call or a simulated telephone call, for example through a test bed environment.

In step 210, the VRS can execute operational software programs to determine which voice prompts to send to the test system. The determination of which voice prompts to send can be based on a variety of factors. A non-exhaustive list of such factors can include previously sent voice prompts, previously initiated programmatic actions, and an established list or test plan specifying voice prompts to be used for testing. In step 215, the VRS can begin sending voice prompts, such as introductory greetings or other phrases. Still, it should be appreciated that the VRS can immediately begin sending signals indicating test data over the established voice link.

In step 220, the VRS can send a signal, such as one or more DTMF signals, to the test system. In an embodiment having multiple signals, the first signal can be considered the primary signal. The primary signal can serve as an indicator that testing information such as a voice prompt is to follow. Turning to step 225, the VRS can send the voice prompt. The voice prompt can provide the test information and/or instructions to the test system. In arrangements with multiple voice prompts, the VRS can send secondary voice signals to distinguish individual voice prompts from one another in step 230.

The voice prompts are selections to be entered or played by the testing system so that tests can be performed on the initiation of VRS programmatic actions and the execution of VRS operational software, i.e., computer programs or modules used by the VRS during execution of the test. Thus, based on the voice prompts sent by the VRS in step 225, the test system can send voice commands to the VRS. That is, the testing system receives the signals and determines that voice prompts are to follow. The testing system receives the voice prompts and plays the voice prompts back to the VRS as voice commands. Accordingly, in step 235, the VRS can receive the voice commands. As noted, the testing system can play back any audio information received from the VRS after the indicator signals whether DTMF signals or speech.

To ensure that the test system provided the appropriate voice commands, the received voice commands can be compared with the voice prompts that were initially sent. For instance, in an embodiment where the voice commands are simply a recorded voice prompt, the VRS can include suitable software and/or hardware for comparing the audio signatures of the voice prompt sent to the testing system and the voice commands received from the testing system. Such a comparison can ensure that the voice commands used to test the VRS are the appropriate commands.

In response to the voice commands received in step 235, the VRS can responsively initiate programmatic actions in step 245. For instance, if the voice commands select a particular option, the VRS initiates a particular programmatic function associated with that option selection. Such a response is tested as if a user selected the option in normal operation of the VRS.

In step 250, one or more of the received voice commands, the voice prompts, and the programmatic actions can be logged. Such a log provides a history of the tests run, the voice commands used, and the programmatic actions in response to the tests. Further, it should be noted that such logging can be referenced in step 210 for determining which voice prompts to send to the test system.

In step 255, the programmatic actions that were initiated can be compared to the expected programmatic actions. Such a comparison can be a simple check of which VRS operational software was initiated in response to the voice commands. The comparison can also analyze the results of the programmatic actions. For example, the VRS can be programmed with a script of expected responsive programmatic actions to which the executed responsive programmatic actions can be compared. Accordingly, such comparisons can determine the relative success or failure of the voice response system.

The method described herein has been provided as an example of one embodiment of the present invention. It should be appreciated by those skilled in the art that the ordering of the steps can vary according to the particular configuration used. Additionally, some steps can be combined in some instances. For example, it should be noted that in one embodiment, step 240 and step 255 can be performed synergistically to produce a test result report. The testing result report can be generated which indicates which voice commands and/or programmatic actions matched specifications listing expected voice commands and/or programmatic actions. Still, it should be appreciated that the executed responsive programmatic actions and the received voice commands can be manually examined.

The present invention provides a solution for testing a VRS. In particular, the VRS can be programmed to provide one or more portions of audio, whether DTMF signals or speech, to a testing system. The VRS provides a signal indicating that the audio information to follow is to be played back to the VRS. Accordingly, the testing system can identify the signal indicating that test information is to follow, then receive the audio information and play that information back to the VRS as a speech command or key selection to imitate a user selection.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of verifying programmatic actions during an execution of a voice response system comprising:
    establishing a voice link between a test system and the voice response system;
    sending a primary signal to the test system over the voice link to indicate that at least one voice prompt is to follow;
    sending at least one secondary signal to the test system over the voice link when more than one voice prompt is to follow, the at least one secondary signal indicating a beginning and ending or a time length of a corresponding voice prompt that is to follow, the at least one secondary signal being sent between consecutively played voice prompts;
    determining at least one voice prompt to send with execution instructions for testing the voice prompt;
    sending the at least one voice prompt to the test system over the voice link
    sending a voice command from the test system to the voice response system in response to the at least one voice prompt; and
    at the voice response system, testing the voice response system with the voice command in accordance with the execution instructions for evaluating a programmatic action in response to the voice command.

2. The method of claim 1, wherein the execution instructions are comprised of one or more dual tone-multi-frequency signals.

3. The method of claim 1, wherein the testing system receives the voice prompt and sends a portion of the voice prompt back to the voice response system as a voice command.

4. The method of claim 1, further comprising comparing a text of an audio portion of the voice command with a text of an audio portion of the voice prompt by converting audio to text using a speech recognition system.

5. The method of claim 1, wherein said testing includes responsively initiating a programmatic action based upon the execution instructions contained within the voice prompt.

6. The method of claim 5, further comprising logging at least one of the voice command, the voice prompt, and the programmatic action.

7. The method of claim 5, wherein said testing compares the programmatic action with an expected programmatic action based on the voice prompt.

8. A system for verifying programmatic actions during an execution of a voice response system comprising:
    means for establishing a voice link between a test system and the voice response system;
    means for sending a primary signal to the test system over the voice link to indicate that at least one voice prompt is to follow and for sending at least one secondary signal to the test system over the voice link when more than one voice prompt is to follow, the at least one secondary signal indicating a beginning and ending or a time length of a corresponding voice prompt that is to follow and being played between consecutively played voice prompts;
    means for determining at least one voice prompt to send with execution instructions for testing the voice prompt;
    means for sending the at least one voice prompt to the test system over the voice link;
    means for sending a voice command from the test system to the voice response system in response to the voice prompt; and
    means for testing, at the voice response system, the voice response system with the voice command in accordance with the execution instructions for evaluating a programmatic action in response to the voice command.

9. The system of claim 8, wherein the execution instructions are comprised of one or more dual tone-multi-frequency signals.

10. The system of claim 8, wherein the testing system receives the voice prompt and sends a portion of the voice prompt back to the voice response system as a voice command.

11. The system of claim 8 further comprising means for comparing a text of an audio portion of the voice command with a text of an audio portion of the voice prompt by converting audio to text using a speech recognition system.

12. The system of claim 8, further comprising means for responsively initiating a programmatic action based upon the execution instructions contained within the voice prompt.

13. The system of claim 12, further comprising means for logging at least one of the voice command, the voice prompt, and the programmatic action.

14. The system of claim 12, further comprising means for comparing the programmatic action with an expected programmatic action based on the voice prompt.

15. A machine readable storage, having stored thereon a computer program having a plurality of code sections executable by a machine for causing the machine to perform the steps of:
- establishing a voice link between a test system and the voice response system;
- sending a primary signal to the test system over the voice link to indicate that at least one voice prompt is to follow;
- sending at least one secondary signal to the test system over the voice link when more than one voice prompt is to follow, the at least one secondary signal indicating a beginning and ending or a time length of a corresponding voice prompt that is to follow, the at least one secondary signal being sent between consecutively played voice prompts;
- determining at least one voice prompt to send with execution instructions for testing the voice prompt;
- sending the at least one voice prompt to the test system over the voice link
- sending a voice command from the test system to the voice response system in response to the at least one voice prompt; and
- at the voice response system, testing the voice response system with the voice command in accordance with the execution instructions for evaluating a programmatic action in response to the voice command.

16. The machine readable storage of claim 15, wherein the execution instructions are comprised of one or more dual tone-multi-frequency signals.

17. The machine readable storage of claim 15, further comprising wherein the testing system receives the voice prompt and sends a portion the voice prompt back to the voice response system as a voice command.

18. The machine readable storage of claim 17, wherein the voice command is an audio signal extracted from a portion of audio in the voice prompt sent by the voice response system to the test system.

19. The machine readable storage of claim 18, further comprising responsively initiating a programmatic action based upon the execution instructions contained within the voice prompt.

20. The machine readable storage of claim 19, further comprising logging at least one of the voice command, the voice prompt, and the programmatic action.

21. The machine readable storage of claim 19, further comprising comparing the programmatic action with an expected programmatic action based on the voice prompt.

\* \* \* \* \*